United States Patent [19]
Duffet et al.

[11] Patent Number: 5,224,873
[45] Date of Patent: Jul. 6, 1993

[54] CONNECTOR FOR A CARD CONTAINING AN ELECTRONIC CIRCUIT

[75] Inventors: Guy Duffet, Pontarlier; Paul Grandgirard, Besancon, both of France

[73] Assignee: Alcatel CIT, Paris, France

[21] Appl. No.: 881,656

[22] Filed: May 12, 1992

[30] Foreign Application Priority Data

May 13, 1991 [FR] France .................. 91 05756

[51] Int. Cl.⁵ .......................................... H01R 13/00
[52] U.S. Cl. ................................. 439/326; 439/377
[58] Field of Search .............. 439/296, 326–328, 439/377, 629–637

[56] References Cited

U.S. PATENT DOCUMENTS 4,128,289 12/1978 Occhipinti .................... 439/326

OTHER PUBLICATIONS

Product Engineering, Shuster, pp. 96 & 97, 439-377.

*Primary Examiner*—Joseph H. McGlynn
*Attorney, Agent, or Firm*—Sughrue, Mion, Zinn, Macpeak & Seas

[57] ABSTRACT

A connector for a card containing an electronic circuit comprises a frame comprising an arrangement for locating the card in an insertion position and an arrangement for holding the card in a reading position parallel to a median plane of the connector in contact with contact members which electrically connect the circuit of the card to a device in which the connector is installed. The insertion position is inclined relative to the reading position. The locating arrangement comprises a groove adapted to receive a first side of the card, formed by at least one fixed part and at least one mobile part respectively adapted to contact a first side and a second side of the card. The mobile part is adapted to press the card against the fixed part to hold the card in the inclined insertion position. The arrangement for holding the card in the reading position is disposed in contact with the first edge and with a second edge opposite the first edge. The card moves from the inclined position to the reading position by tilting about an axis parallel to the groove, this tilting causing displacement of the mobile part by virtue of elasticity so that the mobile part urges the card against the fixed part to hold the card in the reading position.

10 Claims, 2 Drawing Sheets

CONNECTOR FOR A CARD CONTAINING AN ELECTRONIC CIRCUIT

BACKGROUND OF THE INVENTION

1. Field of the invention

The present invention concerns a connector for a card containing an electronic circuit and in particular a smart card connector. A smart card is a card incorporating at least one electronic component with which electrical connections must be established in a card reader fitted to a taxiphone or a machine in a bank, for example.

2. Description of the prior art

The present invention is more particularly concerned with a connector for smart cards which are smaller (15×25 mm) than the familiar standard smart card (54×85 mm). Referred to hereinafter as "minicards", these cards comprise the same circuitry and the same connection system as standard cards. They are for use in portable radiotelephones, for example. They are designed to be used in portable radiotelephones to identify the owner or the renter of a unit, together with other functions. As a general rule, the minicard must be inserted into the connector by qualified personnel, rather than by the end user as is the case with the standard cards, and they must remain inside the unit for some time.

In prior art connectors for standard cards the card is inserted through a slot in the front of the unit. These connectors are described in U.S. Pat. No. 4 743 746, for example. They incorporate a guide casing into which the card is inserted through a front slot in a position slightly inclined relative to a median plane of the connector. The card is then moved into the read position in which contact is established with the electrical circuitry of the unit in which the connector is installed.

In this type of connector a free space must be provided in front of the entry slot sufficiently large to admit the card itself and the fingers of the person inserting the card. This criterion is very difficult to comply with in the case of minicards designed to be inserted into small, typically "pocket-size" units which are required to be of minimum size.

Also, the use of a guide casing increases the thickness of the connector. This is also a problem with minicards for portable units. Some applications require a maximum connector thickness of 3 mm, for example, and the guide casing already has a thickness of around 2 mm.

Furthermore, the usual applications of slotted units do not require absolute protection against possible movement of the card due to impact or vibration because the slotted units are usually installed on a fixed base. Also, in this type of unit the user has access to the card and can therefore re-insert it if it is inserted incorrectly. "Pocket" units, on the other hand, are designed to be carried around and are subjected to considerable movement, and the user must not have access to the minicard as would be required in order to reinsert it. There would therefore be little advantage in employing the connectors used in slotted units for applications using minicards.

Finally, when the card is inserted into the casing the circuitry carried by the card may rub against the inside wall of the casing. This may damage the circuitry of the card.

One object of the present invention is therefore to provide a connector for a card containing an electronic circuit of minimum overall dimensions which holds the card securely.

Another object of the present invention is to provide a connector for a card containing an electronic circuit meeting requirements for use in compact "pocket" units.

SUMMARY OF THE INVENTION

The present invention consists in a connector for a card containing an electronic circuit comprising a frame comprising:

means for locating said card in an insertion position, means for holding said card in a reading position parallel to a median plane of said connector in contact with contact members which electrically connect said circuit of said card to a device in which said connector is installed, said insertion position being inclined relative to said reading position, in which connector said locating means comprise a groove adapted to receive a first edge of said card formed by at least one fixed part and at least one mobile part respectively adapted to contact a first side and a second side of said card, said mobile part being adapted to press said card against said fixed part to hold said card in said inclined insertion position, and said means for holding said card in said reading position are disposed in contact with said first edge and with a second edge opposite said first edge, said card moving from said inclined position to said reading position by tilting about an axis parallel to said groove, said tilting causing displacement of said mobile part by virtue of elasticity so that said mobile part urges said card against said fixed part to hold said card in said reading position.

Because minicards are smaller they are stiffer. It is therefore possible, in accordance with the invention, to apply the tilting force direct to the card and to hold the card by two edges only. This eliminates the need for a guide casing and bulky holding means, so that a connector in accordance with the invention has compact overall dimensions.

What is more, the use of a mobile part and a fixed part to hold the card in the inclined position and to hold it in the read position by virtue of elasticity alone simplifies the connector and ensures that the card is held securely.

The locating means advantageously comprise:

at least a first lip which is part of said fixed part and extends said frame inwardly, said first lip contacting said first side of said card in said inclined position, at least a second lip which is part of said mobile part and faces said first lip to contact said second side of said card in said inclined position, abutment means for halting insertion of said card in said inclined position.

Also, the holding means may comprise:

said fixed part extending said frame inwardly and having a lower edge parallel to said median plane adapted to contact said first side of said card in said reading position near said first edge, said mobile part comprising an elongate elastic member having one end bearing on said card and pressing said card against said lower edge of said fixed part and against the lugs of an elastic retainer opposite said fixed part, said one end being disposed in the vicinity of said fixed part.

The simplicity of the locating means and the holding means reduces the overall size of the connector. Their simplicity is made possible by the high stiffness of the minicard.

What is more, dispensing with a guide casing means that the card can be inserted from above the connector, without using a front slot requiring a large free space. This further reduces the overall dimensions of the connector.

The first lip is advantageously bevelled to mate with a part of the first side of the card in the inclined position.

Likewise, the second lip may be bevelled to mate with a part of the second side of the card in the inclined position.

The abutment means comprise a plurality of parts extending the frame inwardly and each having an upper edge parallel to the median plane.

The abutment means may consist of the contact members.

The frame may further comprise means for verifying the presence of the card and that it is correctly positioned.

The frame, the locating means and the holding means may all be parts of a single component molded from a plastics material.

Finally, resilient retainers may be fitted all around the frame.

Other features and advantages of the present invention will emerge from the following description of a connector in accordance with the invention given by way of non-limiting example only.

DETAILED DESCRIPTION OF THE INVENTION

Parts common to more than one figure are identified by the same reference number.

Figure 1:
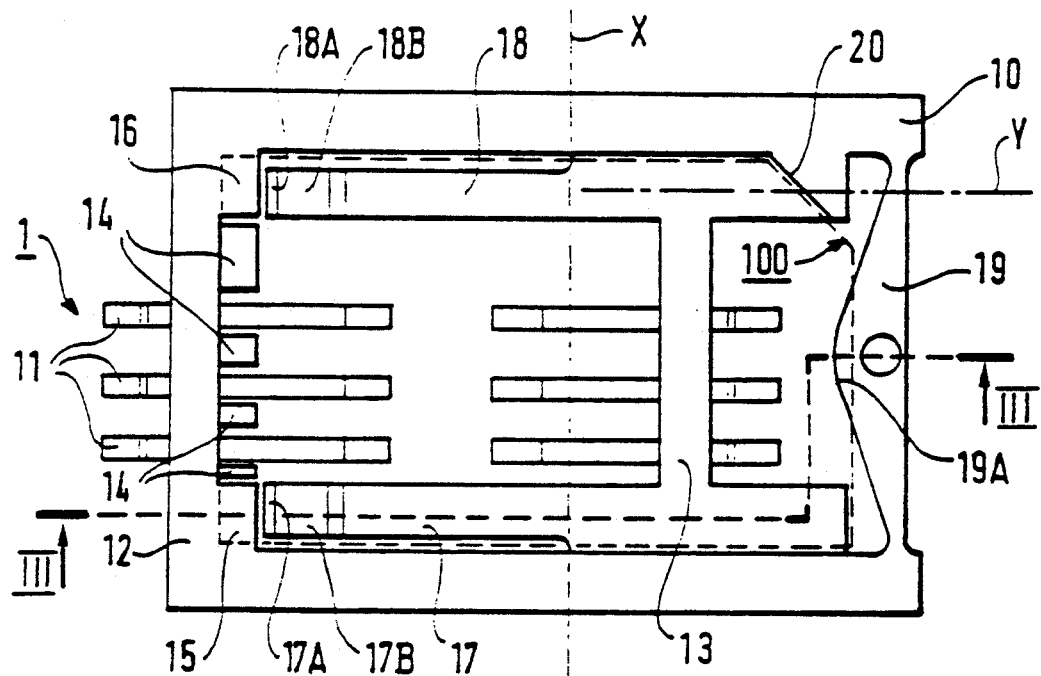
FIG. 1 is a plan view of a connector in accordance with the invention showing a minicard in the read position.
Figure 2:
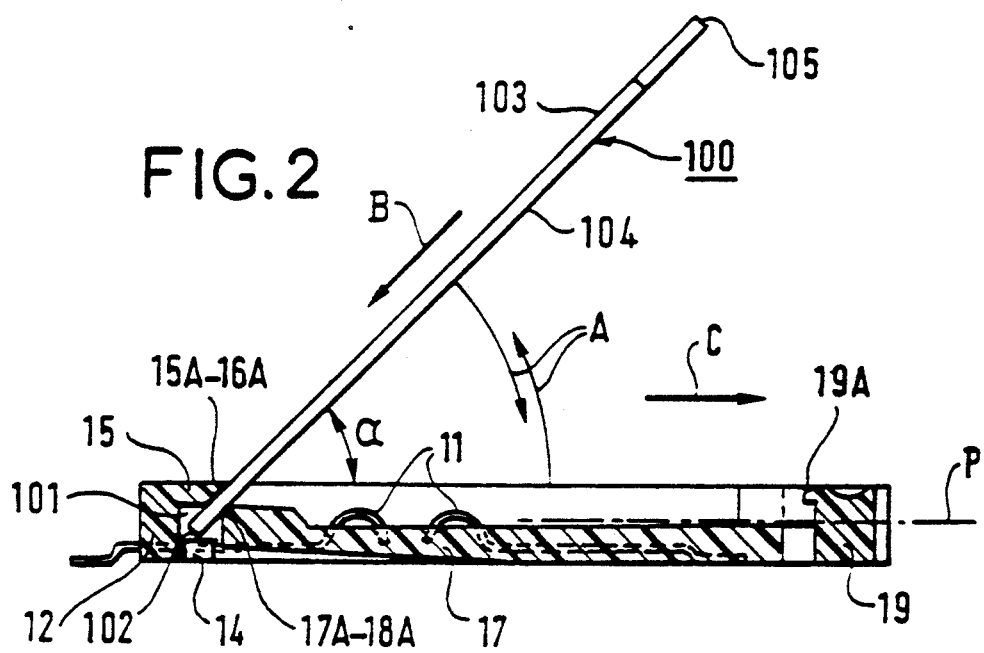
FIG. 2 is a view in cross-section on the line II—II in FIG. 1 showing the connector in accordance with the invention with the minicard in the insertion position.
Figure 3:
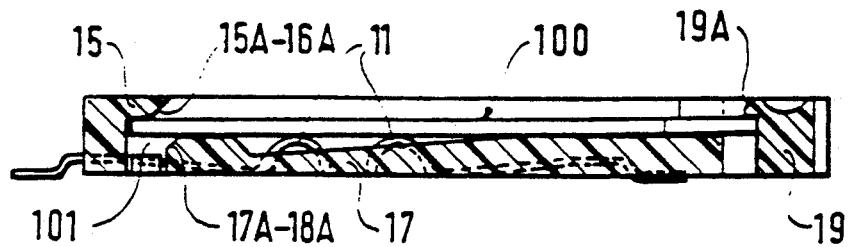
FIG. 3 is a view in cross-section on the line III—III in FIG. 1 showing the connector in accordance with the invention with the minicard in the reading position.

In FIGS. 1 through 3, a connector 1 in accordance with the invention comprises a substantially rectangular contact frame 10 and elastic metal contact blades 11 embedded in bars 12 and 13 of the contact frame 10 (the bar 12 forms one of the shorter sides of the frame 10 and the bar 13 is parallel to it). The blades 11 project slightly above a median plane P of the connector (see FIG. 2).

In accordance with the invention, the frame 10 is further provided with abutments 14 extending the bar 12 towards the interior of the frame 10 and each having an upper edge parallel to the plane P. The abutments 14 are interleaved between the contact blades 11 embedded in the bar.

At opposite ends of the bar 12 are parallelepiped-shape fixed parts 15 and 16 referred to hereinafter as "caps" because, as can be seen in FIG. 2 or 3, they have an inclined bevelled lip 15A, 16A resembling the visor of a cap. The caps 15 and 16 extend towards the interior of the frame 10. Two elastic mobile parts 17 and 18 which are long in comparison with their width are fastened to the bar 13 and face the caps 15 and 16. They have a considerable length cantilevered from the bar 13 and can deform elastically so that both act as levers as will be explained in more detail later. As part of this function they can rotate about an axis X orthogonal to their longitudinal axis Y and lying in a plane parallel to the plane P, to move from a high position which is their rest position shown in FIG. 2 to a low position which is their operational position shown in FIG. 3. Their edge 17A, 18A facing the caps 15, 16 is also bevelled.

The shorter side of the frame 10 opposite the bar 12 comprises an elastic retainer 19. The retainer 19 is substantially triangular in planar shape (see FIG. 1) with one apex 19A rounded and extending towards the interior of the frame 10. The rounded apex 19A constitutes a lug in the plane of FIGS. 2 and 3. The retainer 19 can move in translation along the axis Y.

The frame 10 incorporates a polarizer bevel 20 which prevents incorrect positioning of the circuitry of a minicard 100 (shown in chain-dotted outline for greater clarity) relative to the blades 11.

The parts 10, 12, 13, 14, 15, 16, 17, 18 and 19 may advantageously all be parts of a single component molded from a plastics material.

To give a better idea of the invention the operation of the connector 1 will now be described with reference to FIGS. 2 and 3.

The minicard 100 is inserted into the connector 1 in a position inclined to the plane P as shown by the arrow B in FIG. 1. The angle of inclination $\alpha$ is the angle of inclination of the lips 15A and 16A of the caps 15 and 16 and also that of the lips 17A and 18A of the levers 17 and 18 in their rest position.

A groove 101 formed by the abutments 14, the lips 15A and 17A and the lips 16A and 18A admits the minicard 100. The shorter edge 102 of the card then abuts against the abutments 14 so that the lips 15A and 16A mate along their length with a portion of the side 103 of the minicard 100 and the lips 17A and 18A also mate along their length with a portion of the side 104 of the minicard 100.

When the operator applies a force F to the edge 105 (opposite the edge 102) of the minicard 100 the latter tilts in the direction of the arrow A about an axis parallel to the axis X and part of the groove 101. This applies pressure to the levers 17 and 18 which move to the lower position. The dimensions of the groove 101 are adapted to enable the minicard 100 to pivot in this way.

When the edge 105 contacts the retainer 19 and is pressed against it by the operator the retainer 19 moves away from its original position by retracting in the direction of the arrow C to enable the edge 105 to move past it, after which it returns to its original position whereupon the edge 105 of the minicard 100 is retained by the lug 19A, i.e. the minicard 100 is locked in place by the return of the retainer 19 to its original position and cannot return to its inclined insertion position. FIG. 3 shows the minicard 100 installed in the connector and in the reading position, in contact with the contact blades 11.

The function of the levers 17 and 18 will now be explained in more detail. In their higher rest position they hold the card stable in the insertion position at the angle $\alpha$, supporting it so that it remains in contact with the lips 15A and 16A of the caps 15 and 16. This means that the operator can let go of the card before tilting it towards the retainer 19. In their lower position the shaped ends 17B and 18B of the levers 17 and 18 press the minicard 100 upwards against the caps 15 and 16 so that the minicard 100 is held in a stable position relative to the blades 11 defined by the caps 15 and 16 and the retainer 19; this deforms the blades 11 in bending by a specified amount and therefore procures the electrical contact pressure required to ensure the necessary electrical contact resistance.

The minicard 100 so installed is removed simply by pulling the retainer 19 in the direction of the arrow C, which causes the minicard 100 to tilt virtually immediately in the direction of the arrow A into its insertion position, by virtue of the elasticity of the levers 17 and 18 which act as springs at this time. Removal (and insertion) of the minicard are therefore easy and do not require the use of any special tool.

The angle α is chosen so that the operator can hold and insert the minicard 100 easily. It may vary between 35° and 55° in practice, for example, and depends primarily on the dimensions of the card to be inserted.

The connector in accordance with the invention is advantageously adapted to minicards because the latter, while having the same thickness as standard cards, are much shorter and narrower, which increases their stiffness. Deformation of the card relative to its median plane therefore remains within the required tolerance when it is held against the contact blades by only its two opposite edges. The guide casing and the front slot of the prior art connectors are then of no utility. The overall dimensions of the connector in accordance with the invention are therefore minimal.

Because of the levers 17 and 18 the required contact pressure is applied to the blades 11 and the card is held in a stable position during insertion or reading, however much the unit may move, and insertion and removal of the card are easy and do not require the use of special tools.

The connector in accordance with the invention therefore satisfies the requirements for use in "pocket" devices.

There is no rubbing contact with the card during insertion; this avoids damage to the circuit of the card.

The connector in accordance with the invention that has just been described may be modified in various ways as will now be explained.

Figure 4:
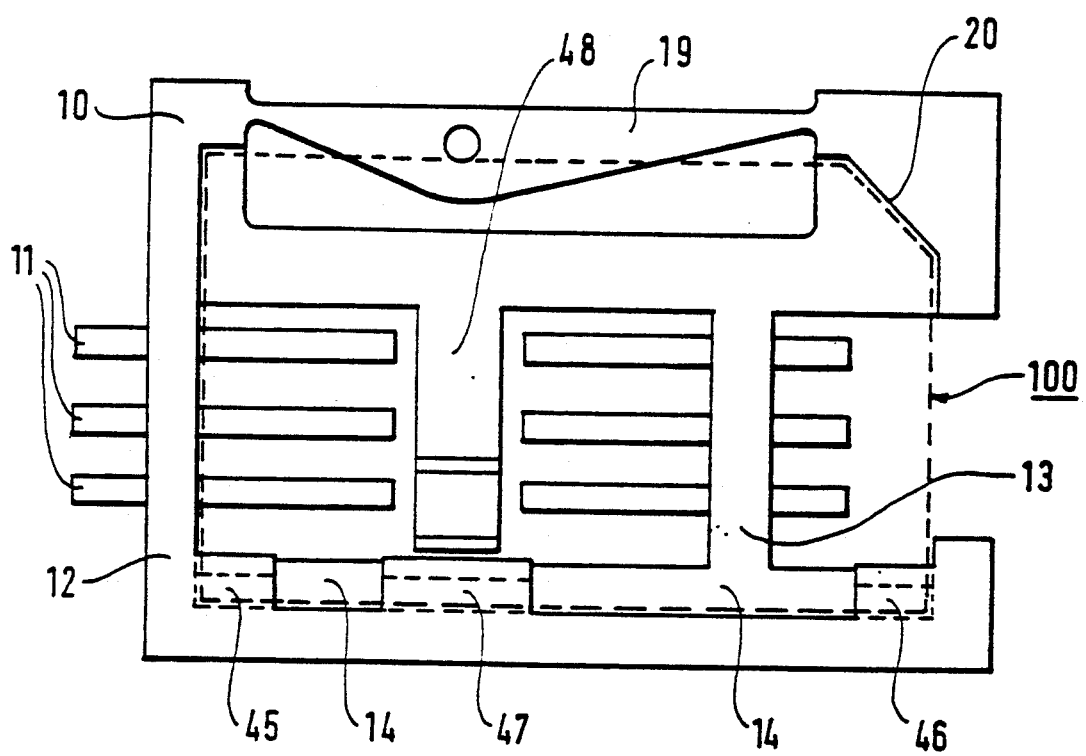
FIG. 4 is a plan view of a different connector in accordance with the invention showing the minicard in the reading position.

Firstly, as shown in FIG. 4, the connector in accordance with the invention may be designed so that the card tilts about one of its longer edges. In this case the card is bent less by the forces exerted by the contact blades 11 because the span of the card between its two opposite supports (the caps and the retainer) is the width of the card rather than its length as is the case in the connector shown in FIGS. 1 through 3.

Because of this, a single central lever 48 is required but it is preferable to provide an additional cap 47 as well as the caps 45 and 46, facing the central lever 48. The others parts are similar to those of the connector 1 from the previous figures and will not be described again in detail.

In another embodiment the abutments 14 are dispensed with and their function is fulfilled by the contact blades 11 embedded in the bar 12. This reduces the cost of molding.

Finally, in a last embodiment, the retainer 19 is not molded in one piece with the other components but is a separate part fixed to the frame 10. Of course, any type of retainer known in this art may be employed.

The above embodiments have the same advantages as the connector 1 from FIGS. 1 through 3.

Of course, the invention is not limited to the embodiments that have just been described.

In particular, additional retainers similar to the retainers 19 may be provided around the frame 10. This holds the card more securely.

The connector in accordance with the invention may also incorporate end of travel contacts in the frame 10 opposite the caps to verify that a card is present in the unit and in the correct position.

Finally, the connector in accordance with the invention may be used for any card including an electronic circuit provided that it has sufficient stiffness.

Of course, any means may be replaced with equivalent means without departing from the scope of the invention.

There is claimed:

1. Connector for a card containing an electronic circuit and having a first side, a second side and median plane, said connector comprising a connector frame including electrical contact members, said frame including:

first means for locating said card in an initial insertion position, and second means for holding said card in a reading position parallel to said median plane of said connector frame and in contact with said contact members which electrically connect said circuit of said card to a device in which said connector is installed, said frame locating means comprising at least one fixed part and at least one elastic mobile part defining a groove adapted to receive a first edge of said card, with said at least one fixed part and said at least one elastic mobile part respectively adapted to contact said first side and said second side of said card, and with said elastic mobile part elastically pressing said card against said fixed part to hold said card in said inclined insertion position, and said holding means comprising means disposed in contact with said first edge and said second edge opposite said first edge, with said card moving from said inclined insertion position to said reading position by tilting about an axis parallel to said groove, and said tilting causing elastic displacement of said mobile part such that said mobile part elastically biases said card against said fixed part to hold said card in said reading position.

2. Connector according to claim 1 wherein said holding means comprise:

said fixed part extending said frame inwardly and having a lower end extending parallel to said median plane and adapted to contact said first edge of said card in said reading position near said fist edge, and said mobile part comprising an elongate elastic member having one end bearing on said care and pressing said card against said lower edge of said fixed part and against lugs of an elastic retainer opposite said fixed part, and said one end being disposed in the vicinity of said fixed part.

3. Connector according to claim 1 wherein said frame further comprises means for verifying the presence of said card and that said card is int h correct position.

4. Connector according to claim 1 wherein said frame, said locating means and said holding means are all parts of a single molded plastics material component.

5. Connector according to claim 1 wherein elastic retainers are fitted all around said frame.

6. Connector according to claim 1 wherein said locating means comprise:
- at least a first lip of said fixed part which extends said frame inwardly, said firs lip adapted to contact said first side of said card in said inclined insertion position,
- at least a second lip of said mobile part facing said first lip and adapted to contact said second side of said card in said inclined insertion position, and
- abutment means for halting insertion of said card in said inclined insertion position.

7. Connector according to claim 6 wherein said first lip is bevelled to mate with a portion of said first side of said card in said inclined position.

8. Connector according to claim 6 wherein said second lip is bevelled to mate with a portion of said second side of said card in said inclined position.

9. Connector according to claim 6 wherein said abutment means comprise a plurality of parts extending said frame inwardly and each having an upper edge parallel to said median plane.

10. Connector according to claim 6 wherein said abutment means comprise said contact members.

* * * * *